3,661,959
METHOD OF MAKING ORGANOGOLD
CHLORIDE COMPLEXES
Lawrence G. Vaughan, Wilmington, Del., assignor to E. I. du Pont de Nemours and Company, Wilmington, Del.
No Drawing. Filed July 30, 1970, Ser. No. 59,712
Int. Cl. C07f 1/12
U.S. Cl. 260—430                           27 Claims

ABSTRACT OF THE DISCLOSURE

There is provided a method of making organogold(I) chloride complexes, L→AuCl, by reacting an organo ligand selected from the group consisting of organo isocyanides, arsines, phosphines, stibines and phosphites with a sulfide gold(I) monochloride complex, $R_1R_2SAuCl$, where $R_1$ and $R_2$ are aliphatic groups containing from 1 to 12 carbon atoms or combine to form a cycloaliphatic group. Also provided are certain new chloro(dialkylphenylisocyanide)gold(I), chloro(diarsine)gold(I)chloro(triarylstibine)gold(I) complexes.

BACKGROUND OF THE INVENTION

Certain organogold(I) chloride complexes within the general class set forth above are known. However, the prior methods for making such complexes have certain limitations such as relatively poor yields and high costs. Such gold chloride complexes have been found to be particularly useful in preparing liquid bright compositions or in producing printed electrical circuitry wherein the composition is applied to a substrate and decomposed by heating to leave a decorative or conductive film of pure gold. The complexes have also been found to be useful as intermediates in preparing other gold compounds which may also be employed in preparing liquid bright compositions or in printed circuitry.

There is reported in the literature a reaction between pyridine and chloro(dimethylsulfide)gold(I) to provide chloro(pyridine)gold(I) [P. C. Ray and D. C. Sen, J. Ind. Chem. Soc., 7 67 (1930)]. However, pyridine is a heterocyclic N compound and is a strong base, and the resulting complex is relatively insoluble. So far as is known this reaction has not been used to make a chloro-(pyridine)gold complex for liquid bright compositions or printed circuitry applications or for use as an intermediate in making other gold compounds.

SUMMARY OF THE INVENTION

The method of the present invention comprises reacting an organo ligand selected from the group consisting of organo isocyanides, arsines, phosphines, stibines and phosphites with a sulfide gold(I) monochloride complex, $R_1R_2SAuCl$, where $R_1$ and $R_2$ are each an aliphatic group containing from 1 to 12 carbon atoms or combine to form a cycloaliphatic group.

DETAILED DESCRIPTION OF THE INVENTION

The reaction may be illustrated by the equation:

$$R(L)_n + nR_1R_2SAuCl \rightarrow R(L \rightarrow AuCl)_n + nR_1R_2S$$

where R is the organo group to which the ligand function (L) is attached, the ligand functions, L, being —N≡C (isocyanide); ≡P (phosphine and phosphite); ≡As (arsine); and ≡Sb (stibine), and $n$ is the number of ligand functions, L, attached to R (usually no more than 2). Herein, reference to "Au" and to "gold" in connection with a gold compound means gold in the +1 oxidation state.

As will be seen from the foregoing the reaction involves a molar proportion of sulfide gold monochloride complex for each ligand function L. However, in practice it is preferred to employ excess of the less expensive organo ligand compound to force completion of the reaction. Up to about 25% molar excess of organo ligand compound over the theoretical 1:1 ratio may be used for this purpose.

One of the principal reactants is the sulfide gold(I) monochloride complex, $R_1R_2SAuCl$. As will be seen from the foregoing, the $R_1R_2S$ is a byproduct and hence the nature of $R_1$ and $R_2$ is relatively unimportant. Generally, each of $R_1$ and $R_2$ is an aliphatic group, saturated or unsaturated, containing up to 12 carbon atoms. In a specific compound, $R_1$ and $R_2$ may be different or the same groups, preferably the same. Examples of suitable sulfide gold monochloride complexes, $R_1R_2SAuCl$, where $R_1$ and $R_2$ are aliphatic groups are chloro(dimethylsulfide)gold(I); chloro(diethylsulfide)gold(I); chloro(di-n-propylsulfide) gold(I); chloro(di-n-butylsulfide)gold(I); chloro(di-n-heptylsulfide(gold(I); chloro(methylethylsulfide)gold(I), chloro(dialkylsulfide)gold(I) and the like. As stated, $R_1$ and $R_2$ may also combine to form a cycloaliphatic group as in the case of chloro(tetrahydrothiophene)gold(I). The presently preferred sulfide gold monochloride complex is chloro(dimethylsulfide)gold(I).

Referring to the organo ligand this compound, as stated, may be an organo isocyanide, -phosphine, -arsine, -stibine or -phosphite.

The isocyanides may be depicted as an organo group, R, to which is attached one or more isocyanide, —N≡C, groups. The organo group, R, may be aliphatic containing from 1 to 12 carbon atoms, and this may be saturated or unsaturated, including diolefinic and acetylenic, although preferably it contains no more than one double bond. Such aliphatic group may be substituted as by halogen; secondary amino, like morpholino, dimethylamino, diethylamino, piperidino and pyrrolidino, or —OSO$_2$—R$_3$ groups where R$_3$ is, for example, methyl, phenyl, p-tolyl, 2-naphthyl, and the like. The organo group, R, may also be cycloaliphatic, like cyclohexyl, or aromatic, like phenyl, biphenyl or naphthyl. Such aromatic groups may also be substituted with, for example, 1 to 5 halogens, 1 to 3 trihalomethyl groups or 1 to 5 alkyl groups each containing from 1 to 6 carbon atoms, or combinations of such substituted groups. Examples of organo isocyanides are methyl isocyanide, ethyl isocyanide, vinyl isocyanide, t-butyl isocyanide, 3-isocyanopropyl morpholine, 2-(p-tosyl) ethyl isocyanide, 1,4 diisocyano butane, cyclohexyl isocyanide, phenyl isocyanide, m-fluorophenyl isocyanide, p-fluorophenyl isocyanide, o-iodophenyl isocyanide, o-bromophenyl isocyanide, pentachlorophenyl isocyanide, o-bromo-m-trifluoromethyl phenyl isocyanide, p-tolylisocyanide, 2,6-diisopropylphenyl isocyanide, 2-methyl 6-ethylphenyl isocyanide, 2,6-diethylphenyl isocyanide, 2,3, 4,5,6-pentamethylphenyl isocyanide, bis (3,5-trifluoromethyl)phenyl isocyanide, 1,4-diisocyano benzene, and the like. Presently preferred isocyanides are alkyl isocyanides in which the alkyl group contains 1 to 6 carbon atoms, especially the ethyl- and t-butyl isocyanides, cyclohexyl isocyanide and especially the dialkylphenyl isocyanides in which each alkyl group contains 1 to 6 carbon atoms, like 2,6-diethylphenyl-, 2,6-diisopropyl phenyl-, 2,6-di-n-hexylphenyl- and 2-methyl 6-ethylphenyl isocyanides. These dialkylphenyl isocyanides provide the corresponding chloro(dialkylphenylisocyanide)gold(I) complexes which are highly soluble and valuable in liquid bright compositions and printed circuitry applications.

In the organoarsines, each arsenic atom has a valence of 3 and hence three organo groups may be attached to a single ≡As atom, or, in the case of diarsines two organo groups may be attached to each As atom which in turn are linked to each other by a divalent organo group. Any

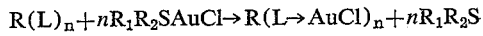

one or all of the organo groups may be aliphatic containing up to 12 carbon atoms, preferably no more than 6, or even 3, carbon atoms. And these may be saturated or unsaturated. These may also be substituted with, for example, halogens. Any one or more of the organo groups may be cyclic, like cycloaliphatic, e.g. cyclohexyl; heterocyclic, like thienyl and furyl; or aromatic, like phenyl or naphthyl, and any of such aromatic groups may be substituted with, for example, 1 to 6 halogens, 1 to 3 trihalomethyl groups, 1 to 4 alkyl groups each containing up to about 6 carbon atoms or further aromatic groups, like phenyl groups, or combinations of such substituted groups. For example, each phenyl group attached to the As may also have attached to it from 1 to 3 phenyl groups. In fact, the presently preferred monoarsine compounds are those in which the three organo groups attached to the As are phenyl groups each containing 0–3 phenyl groups attached to it. Examples of organo arsines are trimethyl arsine, tri-n-butylarsine, trivinylarsine, tri-n-octylarsine, tri-n-dodecylarsine, methyldiethyl arsine, dimethylisopropyl arsine, diethyl-t-butyl arsine, triphenyl arsine, tri-1-naphthyl arsine, tri-2-naphthyl arsine, tris(4-biphenyl) arsine, tris[bis 3,5-diphenyl)phenyl] arsine, tris-(4-chlorophenyl)arsine, tris(4-iodophenyl) arsine, tris(4-bromophenyl) arsine, tris(p-tolyl) arsine, tris(m-tolyl) arsine, tris(4-t-butylphenyl) arsine, tris(4-n-hexylphenyl) arsine, tris(3,4-dimethylphenyl) arsine, tris(3,5-diethylphenyl) arsine, tris(3,4,5-trimethylphenyl) arsine, tris-(2,3,5,6-tetramethylphenyl) arsine, diphenylmethyl arsine, diphenylethyl arsine, diethylphenyl arsine, vinyldiphenyl arsine, tris (2-thienyl) arsine, tris (2-furyl) arsine, diphenyl-2-thienyl arsine, diphenyl-2-naphthyl arsine, bis(2-furyl)phenyl arsine, 1,2-bis(dimethylarsino) benzene and bis(diphenylarsino) methane. Presently preferred arsines are trialkyl arsines (all alkyls the same, 1–8 carbon atoms), triphenyl arsine, diphenylethyl arsine and the diarsines like the bis(dialkylarsino) benzenes and naphthalenes and the bis(diarylarsino)alkanes. In this connection triphenyl arsine is particularly valuable for preparing chloro(triphenylarsine)gold(I) according to the present invention which in turn is particularly useful as an intermediate for preparing 2-pyridyl-, 2-quinolyl-, 8-quinolyl- and 6-phenanthridinyl gold(I) compounds according to my copending application Ser. No. 715,960, filed Mar. 26, 1968 now abandoned. Further in this connection, the diarsine complexes produced according to the present invention, such as the dichloro[arylene, bis(dialkylarsino] digold(I) and dichloro[alkylene bis(arylarsino)]digold-(I) complexes are new compounds. In these compounds, the alkyl and alkylene groups preferably contain from 1 to 6 carbon atoms; the arylene may be phenylene or naphthalene and the aryl groups may be phenyl or naphthyl.

Phosphines and stibines are similar to arsines, and what has been said above concerning the organo groups applies also to phosphines and stibines. Examples of organo phosphines and organo stibines are trimethyl-, trivinyl-, tri-n-butyl-, tri-n-octyl-, tri-n-dodecyl-, methyldiethyl-, dimethylisopropyl-, diethyl-t-butyl-, triphenyl-, tri-1-naphthyl-, tri-2-naphthyl-, tris(4-biphenyl)-, tris[bis(3,5-diphenyl) phenyl], tris(4-chlorophenyl)-, tris(4-iodophenyl)-, tris-(4-bromophenyl)-, tris(p-tolyl)-, tris(m-tolyl)-, tris(4-t-butyl phenyl)-, tris(4-n-hexyl phenyl)-, tris(3,4-dimethylphenyl)-, tris(3,4,5-trimethylphenyl)-, tris(2,3,5,6-tetramethylphenyl)-, diphenylmethyl-, diphenylethyl-, diethylphenyl-, vinyldiphenyl-, pentafluorophenyldiphenyl-, bis-(pentafluorophenyl)phenyl-, tris(m - trifluoromethylphenyl)-, diphenyl-2-naphthyl-, diphenyl-2-thienyl-, bis(2-furyl)-phenyl-, tris(2-thienyl)-, and tris(2-furyl)- phosphines and stibines, bis(diphenylphosphino)methane and bis(diphenylphosphino)ethane and the corresponding distibines. The presently preferred phosphines and stibines are trialkyl (all alkyls the same, 1 to 8 carbon atoms), triaryl- and diaryl alkyl-(especially diphenyl ethyl-)phosphines and stibines. In this connection, the chloro(triaryl-stibine)gold(I) complexes produced according to the present invention are new compounds. The aryl groups in these compounds are preferably phenyl or naphthyl.

The organo phosphites have three alkoxy or aryloxy groups attached to the phosphorous atom. Each alkyl group may contain up to 12 carbon atoms, and the aryl groups may be phenyl or 2-naphthyl each of which may be substituted with 1 to 5 halogens or 1 to 5 alkyl groups containing up to about 6 carbon atoms each. Examples of organo phosphites are trimethyl phosphite, triethyl phosphite, tri-n-octyl phosphite, tri-n-dodecyl phosphite, triphenyl phosphite, tris(p-tolyl) phosphite, tris(di-3,5-t-butyl phenyl) phosphite, tris(2,3,4,5,6-pentamethylphenyl) phosphite, tris(p-bromophenyl) phosphite and tris(pentachlorophenyl) phosphite.

The foregoing types of organo ligand compounds are known and shown in the published literature; see, for example, Reactions of Transition Metal Complexes, by Candlin et al., Elsevier Publishing Company, New York, 1968, and references cited therein.

The reaction between the organo ligand and the sulfide gold(I) monochloride complex generally takes place in an organic solvent. As a general rule, the sulfide gold monochloride complex is less soluble in organic solvents than is the organo ligand. However, sufficient sulfide gold monochloride complex dissolves to initiate the reaction, and, as the reaction proceeds, more sulfide gold monochloride complex goes into solution until the reaction is substantially complete. Likewise, any organo ligand that does not go into solution initially eventually dissolves, and reacts, as the reaction proceeds. The concentration of the reactants in the solvent is not critical; and the concentration of organo ligand may range from about 5 to about 50%, by weight (including any initially undissolved) although in accordance with preferred practice the concentration thereof ranges from about 10 to about 25%. The particular solvent selected may be dictated by procedural considerations such as relative solubility of either one or both of the reactants therein or relative insolubility of the reaction product. For example, in an alcohol, the product organo gold chloride complex may precipitate out, and this may be considered a desirable feature for ease of recovery.

Examples of suitable solvents are aromatic hydrocarbons, like benzene, toluene and xylene; chlorinated hydrocarbons, like chloroform, dichloromethane, trichloroethylene and chlorobenzene; ethers, like diethyl ether and tetrahydrofuran; ketones, like acetone, methyl ethyl ketone and cyclohexanone; esters, like ethyl acetate; alcohols, like methanol, ethanol and isopropanol; dimethylsulfoxide and the like.

As far as reaction temperature is concerned, room temperature is normally adequate although in some cases heating, including exothermic heat from the reaction, may be helpful. Thus, the reaction temperature may go to reflux. In general, the temperature need not be greater than about 100° C., and no advantage is gained by cooling the reaction mixture to below about 0° C.

Operation under atmospheric pressure is satisfactory and use of elevated pressure offers little advantage unless an inert atmosphere, like nitrogen or argon, is employed where the organo ligand is sensitive to air as in the case of some phosphines and arsines. Operation under substantial vacuum is generally precluded in view of the volatility of most organic solvents.

Recovery of the organo gold chloride complex product generally presents no problem. Where it is largely in solution, the solvent, and organo sulfide by-product, may be removed by evaporation with the aid of heat or under reduced pressure or both. Where the product precipitates, at least to some extent, the precipitate may be separated as by filtration or centrifuging, and any remaining dissolved product recovered by evaporation as aforesaid. The recovered product may be purified by conventional techniques, such as by recrystallization.

As stated, one of the preferred uses of the organo gold chloride complex products is in forming metallic gold films, such as for decorative purposes or in making printed electrical circuits. In either case, the compound, usually dissolved in a suitable solvent, is applied to the desired substrate in the desired configuration or pattern and heated to decompose the complex and volatilize or burn away the organic constituents and chlorine. One of the valuable features of the organo gold chloride complex products is their generally good solubility in organic solvents, it often being desirable, in the production of gold films, to employ as highly concentrated solution of the complex as possible. In this connection, the chloro(dialkylphenylisocyanide)gold(I) complexes, especially the 2,6 - dialkylphenyl derivatives, in which the alkyl groups contain from 1 to 6 carbon atoms, are highly soluble in benzene, toluene, chloroform and acetone and are, therefore, particularly useful in producing gold films. These compounds represent a unique class of products provided in accordance with the present invention.

Another important use for the organo gold complex products is as intermediates in the preparation of still other gold compounds which themselves are useful in the production of metallic gold films. For example, the chloro(organoisocyanide)gold(I) products may be used to prepare compounds of the class RNCAuR$_1$ where R is the organo group of the organo isocyanide and R$_1$ is another organo group. Such compounds and their preparation are the subject matter of my copending application Ser. No. 59,713, filed July 30, 1970. And the chloro(organoarsine-, phosphine- or stibine)gold(I) products may be used to prepare 2-pyridyl-, 2-quinolyl-, 8-quinolyl- or 6-phenanthridinyl gold(I) compounds according to my copending application Ser. No. 715,960 filed Mar. 26, 1968. The compounds of both of the foregoing copending applications are particularly useful in the production of gold films. Illustrations of the preparation of other gold compounds are set forth hereinafter in the examples.

In preparing compositions for producing gold films, the organo gold chloride complex is dissolved in a suitable solvent, which may be selected from those set forth hereinabove. Although for most purposes it is desirable to have a fairly concentrated solution where a thick or heavy gold film is desired, the concentration is not critical as a general matter and where a light or thin film is desired relatively low concentrations may be dictated. Thus, in general the concentration of complex in the composition (in terms of gold present) may range from as low as about 0.1 to as high as about 50%, by weight, of gold. In such compositions there may be included an agent to adjust viscosity of the composition and/or to aid in film formation. Sulfurized damar gum serves both of these purposes. Also included in the composition may be a flux to promote adhesion of the metallic gold to the substrate. Resinates of metals like chromium, rhodium and bismuth, and combinations thereof, are suitable for this purpose.

The present invention will be more readily understood from a consideration of the following examples which are given for the purpose of illustration only and are not intended to limit the scope of the invention in any way.

EXAMPLE 1

Preparation of chloro(3-isocyanopropylmorpholine)gold(I)

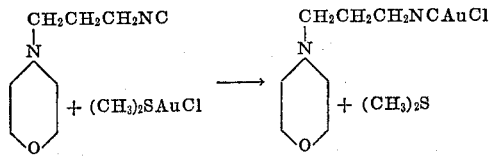

A solution of 6.0 g. (39.0 mmoles) 3-isocyanopropylmorpholine in 15 ml. CHCl$_3$ was added to a suspension of 11.3 g. (38.3 mmoles) chloro (dimethylsulfide) gold in 30 ml. CHCl$_3$. The mixture was stirred for 20 minutes, filtered, and the solvent removed under reduced pressure using a water aspirator. The solid residue was recrystallized from methanol to give 6.4 g. product (43% yield), M.P. 56–58° C. Decomposition to give gold metal occurred at 115°. In the infrared spectrum of the product, a strong isocyanide band occurred at 2247 cm.$^{-1}$.

Analysis.—Calcd. for C$_8$H$_{14}$AuClN$_2$O (percent): C, 24.85; H, 3.65; Au, 50.94; N, 7.25. Found (percent): C, 25.20; H, 3.60; Au, 50.32; N, 7.14.

EXAMPLE 2

Preparation of chloro 2-(p-tosyl) ethyl isocyanide gold (I)

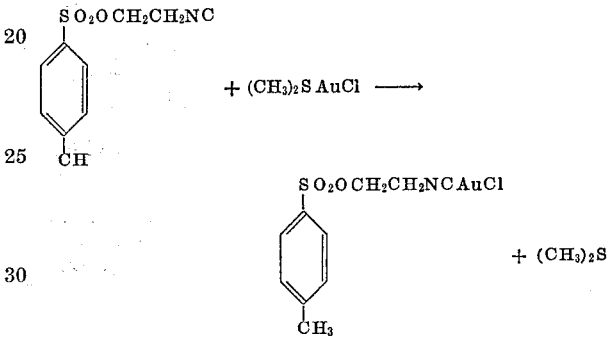

A mixture of 2.0 g. (8.9 mmoles) 2-(p-tosyl) ethyl isocyanide and 2.5 g. (8.5 mmoles) (CH$_3$)$_2$SAuCl in 25 ml. CHCl$_3$ was stirred for two days. Precipitated solid was collected and recrystallized from ethanol, furnishing 0.30 g. product (8% yield), M.P. 167–168° C.

Analysis.—Calcd. for C$_{10}$H$_{11}$AuClNO$_3$S (percent): C, 26.24; H, 2.42; Au, 43.06; N, 3.06. Found (percent): C, 26.71; H, 2.64; Au, 42.58; N, 3.04.

In the infrared spectrum, a strong NC band appeared at 2262 cm.$^{-1}$.

EXAMPLE 3

Preparation of chloro(2,6-diethylphenylisocyanide) gold (I)

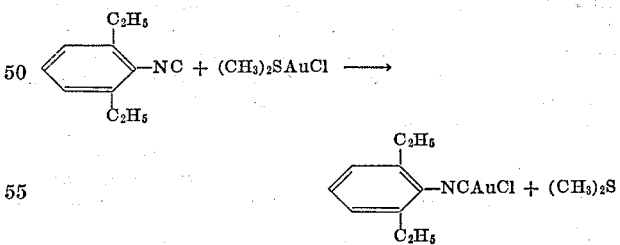

To a suspension of 60.2 g. (0.204 mole) of chloro(dimethylsulfide)gold(I) in 200 ml. dichloromethane was added dropwise a solution of 32.6 g. (0.205 mole) of 2,6-diethylphenylisocyanide in 100 ml. dichloromethane. After a one hour reflux period, the solvent was removed under reduced pressure using a water aspirator. The solid residue was recrystallized from methanol and furnished 72.2 g. product, M.P. 66–68° C.

Analysis.—Calcd. for C$_{11}$H$_{13}$AuClN (percent): C, 33.73; H, 3.34; Au, 50.30; N, 3.58. Found (percent): C, 33.98; H, 3.37; Au, 49.41; N, 3.45.

In a similar manner may be prepared the chloro(dialkylphenylisocyanide)gold(I) complexes, for example: chloro(2,6-dimethylphenylisocyanide)gold(I), chloro(2,6-diisopropylphenylisocyanide)gold(I), chloro(2-methyl 6-ethylphenylisocyanide)gold(I) and chloro(2,6-di-n-hexylphenylisocyanide)gold(I).

EXAMPLE 4

Preparation of chloro(vinylisocyanide)gold(I)

$$CH_2=CHNC + (CH_3)_2SAuCl \rightarrow$$
$$CH_2=CHNCAuCl + (CH_3)_2S$$

| Example | Yield, percent | M.P. (° C.) | Rec. solvent | Analysis, percent | | | | | | | |
|---|---|---|---|---|---|---|---|---|---|---|---|
| | | | | Calculated | | | | Found | | | |
| | | | | C | H | N | Au | C | H | N | Au |
| 6 | 81 | ¹247–248 | Acetone | 23.78 | 1.14 | 3.96 | 55.72 | 23.75 | 1.08 | 4.04 | 54.97 |
| 7 | 93 | ¹205–207 | do | 18.22 | 0.88 | 3.03 | 42.69 | 18.30 | 0.80 | 2.92 | 42.49 |
| 8 | 93 | 176–178 | Benzene | 20.29 | 0.97 | 3.38 | 47.52 | 20.26 | 1.10 | 3.35 | 47.29 |
| 9 | 24 | 166–168 | do | 19.91 | 0.63 | 2.91 | 40.83 | 19.62 | 0.64 | 2.88 | 40.79 |
| 10 | 100 | ¹218–220 | Ethanol | 8.78 | 1.11 | 5.12 | 72.03 | 8.54 | 0.92 | 4.80 | 71.96 |
| 11 | 82 | 110–112 | Methanol | 12.53 | 1.76 | 4.87 | 68.51 | 12.22 | 1.82 | 4.46 | 68.63 |

¹ Dec.

A mixture of 48.0 g. (0.163 mole) (CH₃)₂SAuCl, 8.7 g. (0.164 mole) vinyl isocyanide, 100 ml. ether, and 45 ml. CHCl₃ was stirred overnight. A total of 37.7 g. (81% yield) crude product was collected. An analytical sample, after recrystallization from benzene had M.P. 136–137° C., and began to decompose about 175° C.

*Analysis.*—Calcd. for $C_3H_3AuClN$ (percent): C, 12.62; H, 1.06; Au, 68.99; N, 4.91. Found (percent): C, 12.68; H, 1.46; Au, 68.56; N, 4.75.

In the infrared spectrum (CHCl₃), the isocyanide band appeared as a doublet at 2222 and 2242 cm.⁻¹. The ultraviolet spectrum (dioxane) had λ max 245 mμ (ε=8800) and λ max 250 mμ (ε=8680).

EXAMPLE 5

Preparation of chloro(m-fluorophenylisocyanide) gold (I)

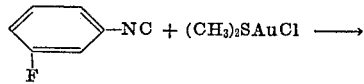

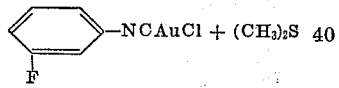

To a suspension of 9.8 g. (33.2 mmoles) of chloro(dimethylsulfide) gold in 50 ml. of chloroform was added a solution of 4.1 g. (33.9 mmoles) m-fluorophenylisocyanide in 30 ml. of chloroform. The mixture was refluxed for 1 hour and then cooled to room temperature and filtered. The collected solid was dissolved in approximately 600 ml. of hot acetone, treated with decolorizing charcoal, and then filtered. On cooling, 7.45 g. (63.5% yield) crystalline product formed, M.P. 223–225° C.

*Analysis.*—Calcd. for $C_7H_4AuClFn$ (percent): C, 23.78; H, 1.14; Au, 55.72; N, 3.96; Found (percent): C, 23.82; H, 0.89; Au, 54.94; N, 4.21. From the mother liquor, an additional 2.70 g. of product was obtained (23% yield), M.P. 223–224°.

The infrared spectrum of the product (KBr) showed a strong isocyanide band at 2227 cm.⁻¹.

EXAMPLES 6–11

Following the general procedure of Example 5, the following compounds were prepared:

Ex. 6: chloro(p-fluorophenylisocyanide)gold(I)
Ex. 7: chloro(o-iodophenylisocyanide)gold(I)
Ex. 8: chloro(o-bromophenylisocyanide)gold(I)
Ex. 9: chloro(o-bromo-m-trifluoromethylphenylisocyanide)gold(I)
Ex. 10: chloro(methyl isocyanide)gold(I)
Ex. 11: chloro(ethyl isocyanide)gold(I)

The foregoing compounds were prepared using the following corresponding isocyanides:

Ex. 6: p-fluorophenyl isocyanide
Ex. 7: o-iodophenyl isocyanide
Ex. 8: o-bromophenyl isocyanide
Ex. 9: o-bromo-m-trifluoromethylphenyl isocyanide
Ex. 10: methyl isocyanide
Ex. 11: ethyl isocyanide The yield and melting point for each product and the recrystallization solvent used are set forth as follows:

EXAMPLE 12

Preparation of chloro (t-butyl isocyanide) gold (I)

To a suspension of 91.2 g. (0.31 mole) of chloro (dimethylsulfide) gold in 250 ml. chloroform was added dropwise a solution fo 26.0 g. (0.313 mole) t-butyl isocyanide. The mixture was filtered to remove a small amount of gold, and the filtrate was stirred overnight. The chloroform was removed under reduced pressure using a water aspirator to give 5.0 g. of solid. Recrystallization from about 60 ml. ethanol gave 58.7 g. product (60% yield) M.P. 165–167° C., dec.

*Analysis.*—Calcd. for $C_5H_9AuClN$ (percent): C, 19.03; H, 2.87; Au, 62.42; N, 4.44. Found (percent): C, 19.12; H, 2.89; Au, 62.39; N, 4.40.

EXAMPLE 13

Preparation of chloro (triphenylarsine) gold (I)

A mixture of 3.06 g. (10 mmoles) triphenyl arsine and 2.94 g. of chloro (dimethylsulfide) gold in 25 ml. chloroform was stirred for one hour. Twenty ml. of methanol was then added and the mixture heated to boiling and filtered. On cooling the filtrate, 3.2 g. of product were obtained (59.5% yield) as large crystals, M.P. 210–211° C., dec. A mixed M.P. of a sample of the product with an authentic sample of chloro (triphenylarsine) gold (I) made by a different process in the literature was the same.

EXAMPLE 14

Preparation of Au,Au'-dichloro [o-phenylenebis(dimethylarsine)] digold (I)

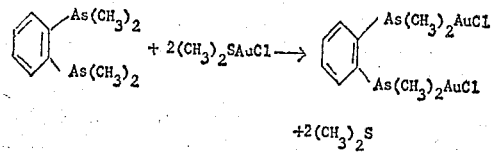

To a suspension of 4.12 g. (14 mmoles) of chloro-(dimethylsulfide) gold in 30 ml. of ether under nitrogen was added a solution of 2.0 g. (7.0 mmoles) of 1,2-bis(dimethylarsino) benzene in 20 ml. of ether. The suspension was stirred for 20 hours and then filtered, and the crude product collected on a sintered glass filter. This crude product was placed in 250 ml. of boiling acetonitrile which was then filtered. On cooling, 1.0 g. (18%) yield product formed, M.P. 210° C., dec.

*Analysis.*—Calcd. for $C_{12}H_{19}As_2Au_2Cl_2N$ (percent): C, 18.20; H, 2.42; Au, 49.75; N, 1.77. Found (percent): C, 18.14; H, 2.40; Au, 49.52; N, 2.08.

The analysis indicated a molecule of acetonitrile had crystallized with the product.

EXAMPLE 15

Preparation of Au,Au'-dichloro[methylenebis (diphenylarsine)]digold (I)

A solution of 1.8 g. (3.8 mmoles) bis(diphenylarsino) methane in 20 ml. of dimethylsulfoxide was added to a solution of 7.6 mmoles chloro(dimethylsulfoxides) gold in 50 ml. of dimethylsulfoxide. The solution was stirred at room temperature for 4 hours and then poured into 300 ml. of water. The precipitate solid was collected and recrystallized from acetonitrile to give 1.2 g. of product (33.5% yield), M.P. 230° C., decomposition.

The infrared spectrum of the product was identical with the spectrum of that of Au.Au'-dichloro[methylenebis (diphenylamine)] digold (I) prepared using gold carbonyl chloride instead of chloro (dimethylsulfide) gold (I) and which analyzed as followed:

Analysis.—Calcd. for $C_{25}H_{22}As_2Au_2Cl_2$ (percent): C, 32.04; H, 2.37; As, 15.99; Au, 42.03. Found (percent): C, 32.21; H, 2.54; As, 14.81; Au, 41.90.

EXAMPLE 16

Preparation of chloro[(pentafluorophenyl)diphenylphosphine] gold (I)

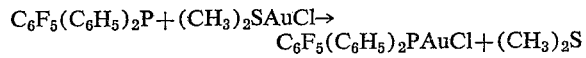

To a slurry of 20.0 g. (0.068 mole) of chloro(dimethylsulfide) gold in 200 ml. of ether was added a solution of 24.0 g. (0.068 mole) of pentafluorophenyldiphenylphosphine in 100 ml. of ether. Most of the suspended solid dissolved and product then began to precipitate. The solution was stirred overnight, then filtered, and recrystallized from 500 ml. of ethanol. The product had M.P. of 164–165° C., and the yield was 33.5 g. (84.5%). From the mother liquor, an additional 2.8 g. was obtained (7% yield).

The melting point of this product was the same as reported in the literature for the same material prepared by a different process.

A further illustration of the preparation of this compound is as follows:

To a suspension of 3.9 g. (12.6 mmoles) of chloro-(dimethylsulfide) gold (I) in 50 ml. of ether was added a solution of 4.45 g. (12.6 mmoles) of (pentafluorophenyl)-diphenylphosphine. The gold complex immediately dissolved upon addition of the phosphine solution. The mixture was stirred for 15 minutes, then filtered to remove a small amount of insoluble material. While the solution was being dried over sodium sulfate, 4.7 g. of crude product precipitated (64% yield). From the mother liquor an additional 0.9 g. was obtained (12.2% yield). An analytical sample was recrystallized twice from a mixture of benzene and cyclohexane, and had melting point 166–167° C. (dec. 170° C.).

Analysis.—Calcd. for $C_{18}H_{10}AuClF_5P$ (percent): C, 36.97; H, 1.72; Au, 33.69; F, 16.25. Found (percent): C, 36.95; H, 1.75; Au, 33.97; F, 15.81.

EXAMPLE 17

Preparation of chloro[bis(pentafluorophenyl) phenylphosphine]gold (I)

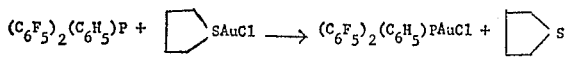

To a suspension of 2.2 g. (6.9 mmoles) of chloro-(tetrahydrothiophene)gold (I) was added a solution of 3.0 g. (6.8 mmoles) of bis(pentafluorophenyl)phenyl phosphine in 15 ml. of ether. The sulfide complex immediately dissolved and the solution was stirred for 10 min. The solution was filtered to remove a small quantity of insoluble material and the ether was removed under vacuum. A white solid precipitated as the ether was removed. It was recrystallized from a 4:1 mixture of cyclohexane and benzene. The yield of product was 2.8 g. (61% yield). From the mother liquor an additional 0.4 g. (8.7%) was obtained. An analytical sample was recrystallized twice from ethanol and had M.P. 164° C., dec.

Analysis.—Calcd. for $C_{18}H_5AuF_{10}ClP$ (percent): C, 32.04; H, 0.75; Au, 29.19; F, 28.17. Found (percent): C, 32.25; H, 0.71; Au, 29.17; F, 29.60.

EXAMPLE 18

Preparation of chloro tris[(m-trifluoromethylphenyl) phosphine]gold (I)

Three grams (10.2 mmoles) of chloro(dimethylsulfide) gold were placed in 50 ml. ether, and 4.8 g. (10.3 mmoles) of tris(m-trifluoromethylphenyl)phosphine in 20 ml. ether were added. The mixture was stirred for 2 hours and then filtered. On standing overnight crystals formed. Recrystallization of these from ethanol gave 3.0 g. of product (42% yield), M.P. 145–147° C., dec. at 174° C. Evaporation of the ether filtrate to dryness gave an additional 2.6 g. of product (36.5% yield), M.P. 145–146° C., dec. 172° C.

Analysis.—Calcd. for $C_{21}H_{12}AuClF_9P$ (percent): C, 36.09; H, 1.73; Au, 28.19; F, 24.48. Found (percent): C, 36.14; H, 1.82; Au, 28.88; F, 24.51.

EXAMPLE 19

Preparation of chloro(tris-pentafluorophenylphosphine) gold (I)

A mixture of 7.0 g. (13.1 mmoles) of tri-pentafluorophenylphosphine and 3.85 g. (13.1 mmoles) of chloro-(dimethylsulfide)gold in 50 ml. chloroform was refluxed for 3 hours. The chloroform was evaporated and the residue was recrystallized from benzenecyclohexane to give 5.4 g. of product (53.5% yield). On heating, the compound darkened at about 200° C., and decomposed slowly at 230–240° C. This decomposition behavior was similar to that of an authentic sample prepared by a different route.

EXAMPLE 20

Preparation of chloro(trimethylphosphine)gold (I)

To a suspension of 60.0 g. (0.203 mole) of chloro-(dimethylsulfide)gold in 250 ml. of methanol was added dropwise a solution of 15.5 g. (0.204 mole) of trimethyl phosphine in 25 ml. methanol over a period of 20 minutes during which the temperature rose to 50° C. The solution was stirred for one half hour and then an additional 1.5 g. (0.02 mole) of trimethyl phosphine was added. The mixture was stirred for two hours. Methanol was added to increase the volume to one liter, and the mixture was heated to reflux and filtered. On cooling, unreacted chloro-(dimethylsulfide)gold was filtered off. On standing solid separated from the filtrate and this was filtered and recrystallized from chloroform-methanol to give two crops of crystalline product. A sample was sublimed to give a product M.P. 234–236° C.

Analysis.—Calcd. for $C_3H_9PAuCl$ (percent): C, 11.68; H, 2.94; Au, 63.85. Found (percent): C, 11.65; H, 2.94; Au, 63.65.

EXAMPLE 21

Preparation of Au,Au'-dichloro[methylenebis(diphenylphosphine)]gold (I)

To a solution of 5.0 g. (12.7 mmoles) of chloroauric acid in 50 ml. of ether was added dropwise a solution of 5 ml. of tetrahydrothiophene in 50 ml. of ether. The yellow solid which precipitated (4.0 g.; 99% yield) was collected on a sintered glass filter and then suspended in a mixture of 50 ml. of ether and 50 ml. of chloroform. To this suspension of chloro(tetrahydrothiophene)gold (I) was then added 2.4 g. (6.25 mmoles) of bis(diphenylphosphino)methane. After the solution was refluxed for 10 minutes, the solvent was removed on a rotary evaporator furnishing 3.0 g. (56.5% yield) of crude product. An analytical sample, after recrystallization from acetonitrile had M.P. 277° C., dec.

Analysis.—Calcd. for $C_{25}H_{22}Au_2Cl_2P_2$ (percent): C, 35.35; H, 2.61; Au, 46.39. Found (percent): C, 35.46; H, 2.66; Au, 46.93.

EXAMPLE 22

Preparation of Au,Au'-dichloro[ethylenebis(diphenylphosphine)]gold (I)

A mixture of 10.0 g. (25 mmoles) of bis(diphenylphosphine)ethane and 14.7 g. (50.0 mmoles) of chloro(dimethylsulfide)gold (I) in 40 ml. ether–40 ml. chloroform was refluxed for 1 hour. The mixture was cooled and the solid product present was collected on a filter to give 7.15 g. (33% yield) of product. The material partly dissolved in dichloromethane (about 5 g./500 ml.) and the undissolved material was collected on a filter, M.P. 300–305° C., dec. Recrystallization from dimethylformamide gave M.P. 295–298° C., dec. This material contained a molecule of dimethylformamide.

*Analysis.*—Calcd. for $C_{29}H_{31}Au_2Cl_2NOP_2$ (compound plus dimethylformamide) (percent): C, 37.19; H, 3.33; Au, 42.08. Found (percent): C, 36.99; H, 3.17; Au, 43.31.

EXAMPLE 23

Preparation of chloro (triphenylphosphite) gold (I)

To a suspension of 5.0 g. (17.0 mmoles) chloro(dimethylsulfide) gold (I) in 50 ml. ether was added 4.2 g. (14.3 mmoles) triphenyl phosphite. The mixture was stirred and filtered. Evaporation of the ether gave crystals which, after being washed with petroleum ether to remove excess triphenyl phosphite, provided 5.5 g. (71% yield) of product. Recrystallization from cyclohexane (about 2 g./75 ml.) gave analytical product M.P. 99–101° C. The literature gives M.P. of 103° and 104–105° C. for chloro(triphenyl phosphite) gold (I) prepared by different processes.

*Analysis.*—Calcd. for $C_{18}H_{15}AuClO_3P$ (percent): C, 39.83; H, 2.79; Au, 36.30. Found (percent): C, 39.68; H, 2.81; Au, 36.06.

EXAMPLE 24

Preparation of chloro(trimethylphosphite) gold (I)

To a suspension of 10.0 g. (34.0 mmoles) of chloro(dimethylsulfide)gold(I) in 75 ml. ether was added 4.4 g. (35.5 mmoles) of trimethylphosphite. Immediate exothermic reaction occurred and the solids dissolved. Then a new solid formed. The mixture was stirred for 2 hours, and filtered. The residue was dissolved in chloroform and the solution was filtered to remove a small quantity of gold. Evaporation of the chloroform from the filtrate left 12.1 g. of product (92.5% yield). Recrystallization from methanol gave analytical sample M.P. 98–100° C. The literature gives a M.P. of 101–102° C. for chloro(trimethylphosphite)gold(I) prepared by a different process.

*Analysis.*—Calcd. for $C_3H_9AuClO_3P$ (percent): C, 10.11; H, 2.54; Au, 55.25. Found (percent): C, 10.22; H, 2.49; Au, 55.80.

EXAMPLE 25

Preparation of chloro(triphenylstibine)gold(I)

A mixture of 2.9 g. (10.0 mmoles) of chloro(dimethylsulfide)gold(I) and 3.5 g. (10.0 mmoles) of triphenyl stibine in 30 ml. ether—20 ml. chloroform was stirred for 2 hours. An additional 100 ml. of ether was added and the solid product was collected on a filter, to give 4.4 g. (75% yield). Recrystallization from ethanol gave product M.P. 130–132° C., dec. with darkening at about 100° C.

The following examples illustrate use for the compounds prepared according to the present invention.

EXAMPLE 26

The chloro(2,6-diethylphenylisocyanide)gold(I) of Example 3, 0.9 gram; 0.5 g. of sulfurized damar gum and 0.35 g. of a 4.5% solution of a mixed chromium-, rhodium-, bismuth resinate (0.4 chromium resinate, 0.9 rhodium resinate and 3.1 bismuth resinate) in a vehicle composed of 30% o-nitrotoluene, 25% cineol, 20% chlorobenzene, 15% camphor and 10% spike lavender oil, were mixed with 2.9 g. of chlorobenzene as solvent.

The mixture was brushed onto a china plate and fired to 750° C. The resulting gold film had excellent abrasion resistance, and could be polished to give a burnished effect.

In like manner the products of the following designated examples may be used to prepare compositions for producing gold films using the solvents designated:

| Product of Example— | Solvent |
| --- | --- |
| 1 | Chloroform. |
| 4 | Acetone. |
| 12 | Tetrahydrofuran. |
| 13 | Do. |
| 16 | Chloroform. |
| 17 | Do. |
| 18 | Do. |
| 19 | Tetrahydrofuran. |
| 20 | Do. |
| 23 | Chloroform. |
| 24 | Do. |
| 25 | Tetrahydrofuran. |

EXAMPLE 27

Preparation of 4-t-butylphenyl(2,6-diethylphenyl isocyanide) gold (I)

To a solution of 4-t-butylphenyl magnesium bromide (32.5 mmoles) in tetrahydrofuran at 0° was added dropwise a solution of 10.0 g. (25.6 mmoles) of chloro (2,6-diethylphenyl isocyanide) gold (I) of Example 3 in 30 ml. tetrahydrofuran. The mixture was stirred at room temperature for one hour, then heated at 60° for thirty minutes. After hydrolysis with saturated ammonium chloride solution, the organic layer was filtered and dried over sodium sulfate. The solvent was then removed under reduced pressure and the solid residue recrystallized from cyclohexane. The yield of product, M.P. 167–170° C., dec., was 8.42 g. (67%).

*Analysis.*—Calcd. for $C_{21}H_{26}AuN$ (percent): C, 51.53; H, 5.36; Au, 40.25; N, 2.86. Found (percent): C, 50.88; H, 5.21; Au, 40.01; N, 2.83.

One gram of the 4-t-butylphenyl (2,6-diethylphenyl isocyanide) gold (I), 0.3 g. of sulfurized damar gum and 0.35 g. of the mixed resinate solution used in Example 26 were mixed with 3 g. of chlorobenzene.

The mixture was brushed onto a china plate and fired to 750° C. The resulting bright gold film had excellent abrasion resistance.

EXAMPLE 28

Preparation of chloro (5-norbornylene isocyanide) gold (I)

To a suspension of 1.5 g. (5.25 mmoles) of chloro (vinyl isocyanide) gold (I) of Example 4 in 20 ml. benzene was added 4.1 g. (63 mmoles) cyclopentadiene. The mixture was stirred at room temperature for one hour, then refluxed for one hour. The solvent was removed under reduced pressure, and the residue was recrystallized from 20 ml. ethanol. The product had M.P. 108–110° C.

EXAMPLES 29–32

Preparation of fluorophenyl(fluorophenyl isocyanide) gold (I) compounds

The chloro (m-fluorophenyl isocyanide) gold (I) 4.5 g. (12.8 mmoles) of Example 5 was added to 50 ml. ether containing 14.3 mmoles of m-fluorophenylmagnesium bromide at 0° C. The mixture was allowed to warm, stirred at room temperature for 1 hour, then refluxed for 1 hour. After hydrolysis with excess water, the ether layer was separated, dried over sodium sulfate, treated with decolorizing charcoal and filtered. The product was recrystallized first from a mixture of 200 ml. cyclohexane and 10 ml. benzene (65° C.), then recrystallizied a second time from methanol (not over 60° C.) giving an analytical product M.P. 110–111° C., dec. The yield was 4.95 g. (9%) (Example 32). In like manner chloro (p-fluorophenyl isocyanide) gold (I) of Example 6 and m- or p-fluorophenylmagnesium bromide were used to prepare compounds of Examples 29-31.

(29) p-fluorophenyl (p-fluorophenyl isocyanide) gold (I)
(30) p-fluorophenyl (m-fluorophenyl isocyanide) gold (I)
(31) m-fluorophenyl (p-fluorophenyl isocyanide) gold (I)
(32) m-fluorophenyl (m-fluorophenyl isocyanide) gold (I)

The compounds of Examples 29 and 30 were recrystallized first from a mixture (3:1 and 5:1, respectively) of cyclohexane and benzene, then from methanol. The compound of Example 31 was recrystallized first from cyclohexane, then from ethanol.

The yields, melting points and analyses are set forth as follows:

| Example | Yield, percent | M.P. (° C.) | Calculated | | | | Found | | | |
|---|---|---|---|---|---|---|---|---|---|---|
| | | | C | H | N | Au | C | H | N | Au |
| 29 | 9.7 | 1 153-155 | 37.78 | 1.95 | 3.39 | 47.68 | 37.73 | 2.11 | 3.87 | 47.30 |
| 30 | 25 | 1 126-128 | 37.78 | 1.95 | 3.39 | 47.68 | 37.81 | 2.06 | 3.47 | 47.27 |
| 31 | 58.5 | 1 138-140 | 37.78 | 1.95 | 3.39 | 47.68 | 37.76 | 1.96 | 3.29 | 47.57 |
| 32 | 94 | 1 110-111 | 37.78 | 1.95 | 3.39 | 47.68 | 37.73 | 1.80 | 3.24 | 47.51 |

1 Dec.

EXAMPLE 33

Preparation of pentafluorophenyl(triphenylphosphine) gold (I)

To 0.485 g. of magnesium (20.2 mg.-atoms), covered by 15 ml. of ether, was added dropwise 5.0 g. (20.2 mmoles) of bromopentafluorobenzene in 25 ml. ether. When the Grignard reagent was formed, a solution of 9.5 g. (15.2 mmoles) of chloro (triphenylphosphine) gold (I) of Example 19 in 100 ml. of hot tetrahydrofuran was added. The mixture was heated at 60° C. for 3 hours, then cooled and stirred at room temperature overnight. After hydrolysis with saturated ammonium chloride solution, the organic solution was treated with decolorizing charcoal and the solvents were removed in a rotary evaporator. The oily residue was dissolved in benzene and, after standing overnight, the material was filtered and the benzene was removed on a rotary evaporator. The residue was dissolved in 50 ml. cyclohexane, the solution was treated wtih decolorizing charcoal and filtered. On cooling, 6.3 g. of product crystallized (52.2% yield). An analytical sample was recrystallized three times from cyclohexane, M.P. 171-172° C. (dec. about 300° C.).

Analysis.—Calcd for $C_{24}H_{15}AuF_5P$ (percent): C, 46.02; H, 2.41; Au, 31.45. Found (percent): C, 46.22; H, 2.52; Au, 31.41.

EXAMPLES 34-36

Following the procedure of Example 33 related compounds:

(34) m-fluorophenyl (triphenylphosphine) gold (I)
(35) p-fluorophenyl (triphenylphosphine) gold (I)
(36) m-(trifluoromethyl) phenyl(triphenylphosphine) gold (I)

were prepared using the appropriate Grignard reagents. In these cases, the chloro (triphenylphosphine) gold (I) was added as a solid rather than in tetrahydrofuran solution.

EXAMPLE 37

Preparation of 2-pyridylgold (I)

To 8 ml. of a butyllithium solution of hexane containing 0.815 g. of butyllithium (12.5 mmoles) at −65° C. was added 20 ml. of tetrahydrofuran over a 15-minute period. A solution of 2.0 g. (12.6 mmoles) of 2-bromopyridine in 15 ml. of tetrahydrofuran was then added to the solution over a 5 - minute period. The mixture was stirred at −65° C. for an additional 5 minutes, then 4.5 g. (8.35 mmoles) of chloro(triphenylarsine)gold (I) was added in one batch. The mixture was stirred at room temperature for 2 hours, then 1.0 g. (9.2 mmoles) of trimethylchlorosilane was added to react with excess lithium reagent. The mixture was then filtered through a sintered glass filter and the solid on the filter was dried at room temperature and about 0.1 mm. to give 2.0 g. (87% yield) of crude 2-pyridylgold (I). After recrystallization from pyridine, an analytical sample began to darken at 120° C. and melted with decomposition at 150° C.

Analysis.—Calcd. for $C_5H_4AuN$ (percent): C, 1.83; H, 1.47; Au, 71.61; N, 5.09. Found (percent): C, 22.07; H, 1.34; Au, 71.34; N, 4.97.

The product can also be obtained by substituting chloro(triphenylphosphine)gold(I) or chloro(triphenylstibine)gold(I) for chloro(triphenylarsine)gold(I) in the process of this example.

A suspension of 100 mg. 2-pyridylgold(I) of this Example in 3 ml. of diethyl sulfoxide was heated to reflux. The resulting solution first turned purple, and then a brilliant gold film was deposited on the walls of the glass vessel.

The decomposition of 2-pyridylgold at its melting point (or at lower temperatures under vacuum) quantitatively produces metallic gold and 2,2'-bipyridine. This permits deposition of pure gold films under very mild thermal conditions.

What is claimed is:

1. The method of preparing chloro organogold(I) compounds which comprises reacting an organo ligand selected from the group consisting of organo isocyanides, arsines, phosphines, stibines and phosphites with a sulfide gold monochloride complex having the formula $$R_1R_2SAuCl$$

where $R_1$ and $R_2$ are each an aliphatic group containing from 1 to 12 carbon atoms or combine to form a cycloaliphatic group.

2. The method of claim 1 wherein the reaction is at a temperature of from about 0 to about 100° C.

3. The method of claim 1 wherein the reaction takes place in the presence of an inert solvent.

4. The method of claim 3 wherein the solvent is selected from the group consisting of aromatic hydrocarbons and chlorinated hydrocarbons.

| Example | Yield, percent | M.P. (° C.) | Calculated | | | | Found | | | |
|---|---|---|---|---|---|---|---|---|---|---|
| | | | C | H | Au | F | C | H | Au | F |
| 34 | 48 | 154 | 52.00 | 3.45 | 35.54 | 3.42 | 51.89 | 3.64 | 35.52 | 3.03 |
| 35 | 36 | 141 | 52.00 | 3.45 | 35.54 | 3.42 | 51.71 | 3.38 | 35.25 | 3.09 |
| 36 | 41 | 150 | 49.68 | 3.17 | 32.60 | 9.43 | 49.52 | 3.05 | 32.23 | 8.51 |

5. The method of claim 1 wherein $R_1$ and $R_2$ are each methyl.

6. The method of claim 1 wherein the organo ligand is an organo isocyanide.

7. The method of claim 6 wherein the organo isocyanide is an alkyl isocyanide, cyclohexyl isocyanide or a dialkylphenyl isocyanide in which each alkyl group contains 1 to 6 carbon atoms.

8. The method of claim 7 wherein the organo isocyanide is a dialkylphenyl isocyanide in which the alkyl groups are in the 2- and 6-positions, respectively.

9. The method of claim 8 wherein said dialkylphenyl isocyanide is 2,6-diethylphenyl isocyanide.

10. The method of claim 1 wherein the organo ligand is a trialkyl arsine, triphenyl arsine, bis(dialkylarsino) benzene or naphthalene or a bis(diarylarsino)alkane.

11. The method of claim 10 wherein the organo arsine is triphenyl arsine.

12. The method of claim 1 wherein the organo ligand is a trialkyl-, triaryl- or diarylalkyl phosphine or stibine.

13. The method of claim 6 wherein $R_1$ and $R_2$ are each methyl.

14. The method of claim 7 wherein $R_1$ and $R_2$ are each methyl.

15. The method of claim 8 wherein $R_1$ and $R_2$ are each methyl.

16. The method of claim 9 wherein $R_1$ and $R_2$ are each methyl.

17. The method of claim 10 wherein $R_1$ and $R_2$ are each methyl.

18. The method of claim 11 wherein $R_1$ and $R_2$ are each methyl.

19. The method of claim 12 wherein $R_1$ and $R_2$ are each methyl.

20. Chloro(dialkylphenylisocyanide)gold(I) complexes having the formula

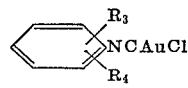

where $R_3$ and $R_4$ are each alkyl groups containing from 1 to 6 carbon atoms.

21. The compounds of claim 20 wherein $R_3$ and $R_4$ are in the 2- and 6-positions, respectively.

22. Chloro(2,6-diethylphenylisocyanide)gold(I).

23. Dichloro{(arylene bis(dialkylarsine)} digold(I) compounds wherein arylene is phenylene or naphthalene and where the alkyl groups contain 1 to 6 carbon atoms.

24. Dichloro[phenylene bis(dimethylarsine)]digold(I).

25. Dichloro[alkylene bis(diarylarsine)]digold(I) compounds.

26. The compounds of claim 25 wherein the alkylene group contains 1 to 6 carbon atoms, and where the aryl groups are phenyl or naphthyl groups.

27. Dichloro[methylene bis(diphenylarsine)] digold (I).

References Cited

Vaughan et al., J. Amer. Chem. Soc., vol. 91, pp. 6153–6, October 1969.

Chemical Abstracts, vol. 52, pg. 20029h (1958).

Westland, Can. J. Chem., vol. 47, pp. 4135–40 (1969).

Kasenally et al., J. Chem. Soc., pp. 3407–11 (1965).

TOBIAS E. LEVOW, Primary Examiner

H. M. S. SNEED, Assistant Examiner

U.S. Cl. X.R.

117—107.2; 260—270 R, 329, 346.1 M

PO-1050
(5/69)

UNITED STATES PATENT OFFICE
CERTIFICATE OF CORRECTION

Patent No. 3,661,959          Dated May 9, 1972

Inventor(s) Lawrence G. Vaughan

It is certified that error appears in the above-identified patent and that said Letters Patent are hereby corrected as shown below:

Column 6, line 25, change "CH" to -- $CH_3$ --. Column 8, line 23, change "fo" to -- of --. Column 9, line 1, change "oxides)" to -- oxide) --. Column 14, line 33, change "C, 1.83" to -- C, 21.83 --.

Signed and sealed this 6th day of March 1973.

(SEAL)
Attest:

EDWARD M. FLETCHER, JR.
Attesting Officer

ROBERT GOTTSCHALK
Commissioner of Patents